_United States Patent Office_

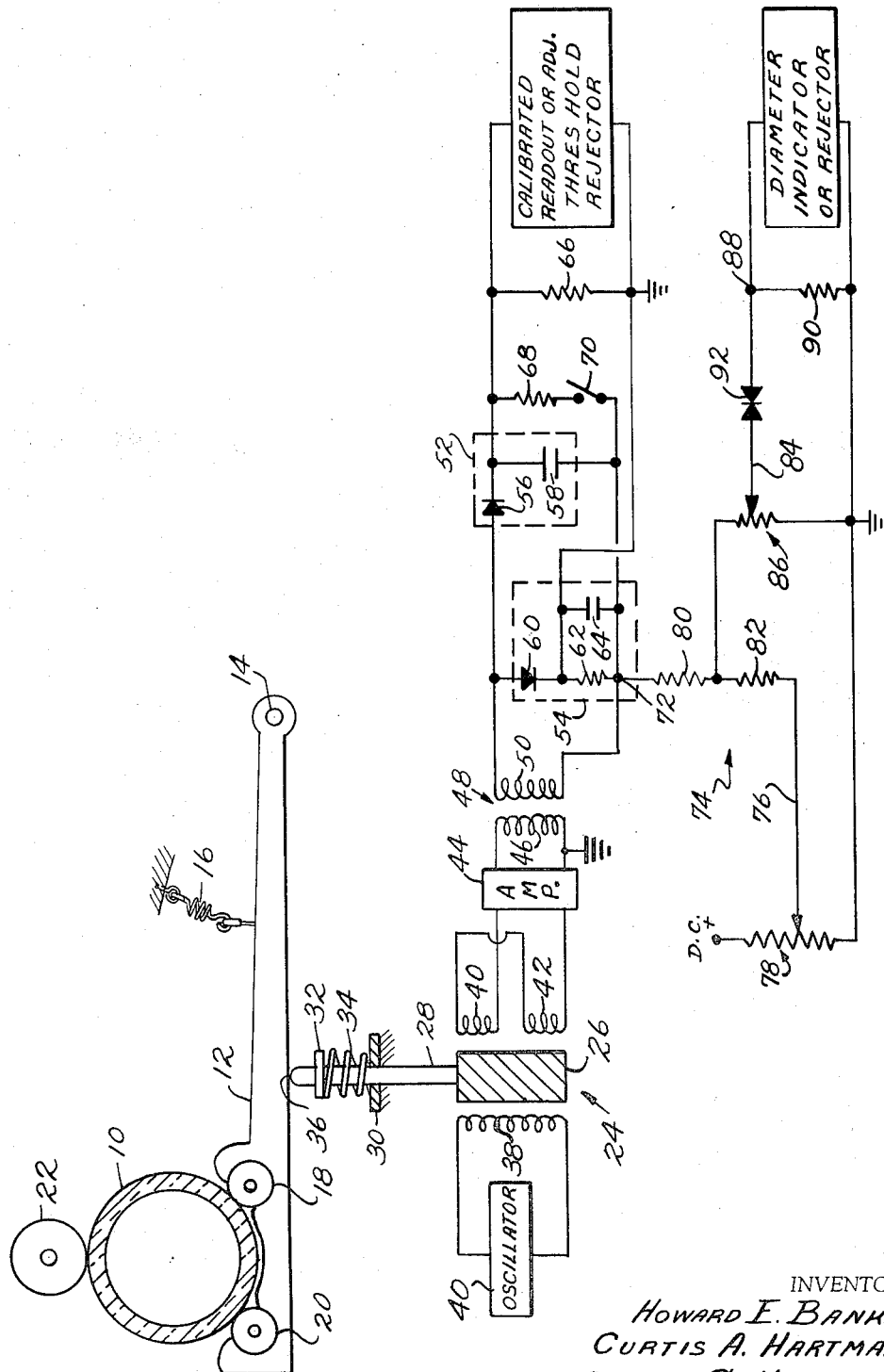

3,371,419
Patented Mar. 5, 1968

3,371,419
OUT-OF-ROUNDNESS AND DIAMETER GAGE
Howard E. Banks, Horseheads, and Curtis A. Hartman, Elmira, N.Y., and Robert S. Hallstein, Enon, Ohio, assignors, by mesne assignments, to Rexall Drug and Chemical Company, Los Angeles, Calif., a corporation of Delaware
Filed Oct. 15, 1962, Ser. No. 230,651
17 Claims. (Cl. 33—174)

This invention relates to apparatus for inspecting the peripheral configuration of circular objects for out-of-round or like conditions, and to apparatus for simultaneously indicating whether the maximum and/or minimum diameter of the object being inspected is within a tolerable range. In particular, the invention relates to a gage for sensing any out-of-round or like condition of a circular object and determining whether that condition is within tolerable bounds, and such is the primary object thereof. As a secondary feature, the apparatus automatically rejects any inspected object whose peripheral configuration is intolerable, or whose diameter is larger or smaller than a predetermined value.

There are many instances in which it is desirable, if not absolutely necessary, to have cylindrical objects be exactly, or nearly exactly, round, so that such objects may be subjected to further manual or automatic operations without the necessity of coping with out-of-round or like conditions or improper diameter. One of the types of cylindrical or circular objects that needs to be kept within bounds both from an out-of-round viewpoint as well as in diameter, is an ordinary glass bottle that is to be subsequently operated on in any one of numerous ways such as labelling or filling. However, this invention is not limited to bottles, for it obviously is applicable to test the out-of-round or like condition and diameter of any object which approaches roundness.

It is an object of this invention to produce apparatus for automatically inspecting the peripheral configuration of circular objects at a speed heretofore unobtainable.

Other objects, features, and advantages of this invention will be apparent upon reading the appended claims in conjunction with the following detailed description in view of the attached drawing.

The circular object 10, which may be a glass bottle, for example, is shown in the drawing in a transverse cross-sectional view. An idler arm 12, biased clockwise about its pivot point 14 by spring 16 if desired, carries two freely rotatable idler wheels 18 and 20 which rotate against the periphery of bottle 10 when that bottle is caused to rotate, as by a drive wheel 22.

If bottle 10 is perfectly round, arm 12 does not move at all about its pivot point 14. However, if bottle 10 is out-of-round, arm 12 oscillates or reciprocates vertically while drive wheel 22 rotates the bottle, since the drive wheel axis is fixed in space. In other words, when arm 12 and its idler wheels 18 and 20 force the bottle 10 against rotating drive wheel 22, the resulting rotation of the bottle, if it is out-of-round, causes cyclic displacement of the idler arm 12, wheel 22 being a fixed reference plane.

At any desirable point along the length of idler arm 12, the displacement of the arm is coupled to a differential transformer 24, preferably of the linearly variable type. A rotary differential transformer may be employed if desired. The core 26 of transformer 24 has an arm 28 that protrudes upwardly through an aperture in fixed element 30. The upper part of arm 28 carries a C-washer or the like designated 32, and a spring 34 between the fixed element 30 and element 32 causes the nose 36 of arm 28 to follow the displacements of idler arm 12 faithfully. Accordingly, the transformer core 26 moves up and down with the vertical movements of idler arm 12.

To the primary winding 38 of the differential transformer is connected a signal produced by oscillator 40. This signal may have a frequency of 40 kc., for example, or any other desired frequency in accordinace with the application at hand. As usual with differential transfomers, the secondary or output windings 40 and 42 are connected in series opposition to their output circuity, which in this instance may include an amplifier 44. The signal recieved, then by the primary winding 46 of a second transformer 48 is in the form of an amplitude modulated carrier. That is, the instant position of core 26 of the differential transformer 24 determines the instant amplitude of the amplified signal recieved by primary winding 46.

In operation, the characteristic of the signal to winding 46 that varies with the peripheral condition of bottle 10, is the amplitude of the signal. This signal is applied through the secondary winding 50 to a peak detector 52 and simultaneously to a demodulation or modulation detector circuit 54. The peak detector, as illustrated, includes a series diode 56 and a parallel condenser 58. This condenser has a time constant long compared to the period of modulation received from secondary winding 50, i.e., compared to the cyclic time of bottle 10, and consequently charges to the highest peak voltage of the amplitude modulated carrier wave, and remains at that voltage during the complete inspection time. On the other hand, the modulation detector 54 which includes a diode 60 serially connected to the parallel combination of resistor 62 and condenser 64, has a time constant short compared to the maximum rate of change of the transformer core 28, but long compared to the energizing frequency of oscillator 40. Therefore, the charge on condenser 64 varies as the carrier modulation.

The peak detector 52 therefore provides a DC voltage across resistor 66, which is a direct function of either the maximum or minimum diameter of the bottle 10 being instantly inspected. For example, if the arrangement is such that reception of a bottle 10 between the idler wheels and drive wheel 22 allows differential transformer core 26 to move upwardly from what might be termed a null or zero output, which point may represent for example the maximum possible bottle diameter the equipment will accommodate, then the peak of the carrier wave detected by circuit 52 represents the minimum diameter that the bottle 10 being inspected has. On the other hand, the arrangement can be reversed so that the output of the peak detector represents the maximum diameter of the bottle being inspected, but for purpose of further explanation, let it be assumed that the voltage from peak detector 52 indicates the minimum diameter.

At the same time as that steady peak signal appears across resistor 66, condenser 64 also provides thereacross the varying voltage signal from demodulator 54. This varying signal is a direct function of the instantaneous diameter of the rotating bottle and, due to its manner of connection to resistor 66 as compared to the connection thereto of the signal from peak detector 52, has its instant value continuously subtracted from the peak signal by resistor 66. In effect, resistor 66 is therefore a comparator, the output of which is a direct function of variation in diameter of the bottle and is unrelated to any absolute diameter thereof. In essence, the maximum value of the output voltage from resistor 66 is the peak-to-valley voltage of the modulation envelope and represents the variation from minimum to maximum diameter of the bottle as it is rotated. The absolute magnitude of the diameter of the bottle does not have any signal counterpart represented in the output from resistor 66, since the circuitry is sensitive only to variation in diameter. Thus, resistor 66, by effecting subtraction between the signals across condensers 58 and 64, provides an output, the maximum value of which indicates the difference between adjacent values (peak and valley) of the amplitude characteristic of the amplitude modulated carrier received from secondary winding 50.

This signal may be used in any desired manner. For example, it may be applied to a calibrated readout indicator for visually noting whether the bottle varies at all in its roundness, or whether it varies within predetermined tolerable limits of out-of-roundness. With the readout indicator being calibrated, when the signal exceeds tolerable limits, the bottle can then be manually removed and rejected. On the other hand, the output of resistor 66 may be applied to an adjustable threshold device, which in turn may actuate an automatic bottle rejector if the threshold is exceeded. Such an adjustable threshold device may take any well known form, for example of a diode serially connected in the ungrounded output line from resistor 66 with adjustable biasing of the diode being effected via the variable arm of a potentiometer otherwise connected across a positive voltage. The output of this adjustable threshold device may be amplified if desired, and then utilized to operate any known type of rejecting system which will cause an intolerably configured bottle to be removed into a rejection bin or the like when the signal from resistor 66 exceeds the level set by the adjustable threshold device and thereby indicates that excessive out-of-roundness or the like has been detected.

As above indicated, resistor 66 operates to effect a comparison between the instant voltage across condensers 58 and 64, the former of which remains substantially steady at a value indicating the minimum diameter of the bottle being inspected, while the latter continuously varies to provide a signal representing the instant diameter of the rotating bottle. This resistor actually effects algebraic addition of these two signals since the peak and demodulated voltages are out of phase with each other, causing the difference output thereof across resistor 66 to vary the same as does the carrier envelope but 180° out of phase therewith. In other words, due to the manner in which the circuitry is connected, resistor 66 combines and compares the two voltages. Any other type of comparator or combiner may be employed instead of a resistor, for example an oscilloscope, and the resistor itself is not especially needed for such purposes but only as a load when the comparator or other subsequent equipment does not itself sufficiently supply a loading impedance.

In order to appreciate fully the capabilities of this system, it is desirable to understand the requirements for high-speed out-of-roundness and the limitations of conventional methods. In automatic out-of-roundness inspection where the specimen is rotated, it is required for high-speed operation to keep inspection time at a minimum and inspection rate at a maximum. It is necessary, however, to rotate the specimen through 360° while it is stable in the inspection station. Rotation must be a compromise governed by ability to rotate the specimen at a high speed but in a stable position. This may mean inspection time and cycle time are nearly the same. The signal generated by an out-of-round specimen is a function of rotation speed; for an elliptical specimen the frequency would be twice the rotation speed in revolutions per second. If the rotation speed is 300 r.p.m. or 5 r.p.s. for example, the frequency would then be 10 cycles per second. The electronic circuitry must therefore be capable of flat response down to this frequency. A differential transformer is capable of this since it is a device which responds to position as well as change in position. Because such a transformer is position-sensitive, it presents the problem, however, of giving signals representing diameter as well as variation in diameter. This can be eliminated by capacitive coupling at a low inspection rate, but the R-C product required to couple 10 c.p.s. or less causes recovery time far too great to allow a high inspection rate. As the differential transformer core is brought into position representing a point on the periphery of the specimen, a signal is generated. This signal is unwanted since it is only a function of movement made in contacting the specimen. However, with the long-time constants necessary the signal persists for a relatively long time, for example several seconds.

A high speed system therefore requires (1) flat response down to a low sub-audio frequency such as 10 c.p.s. or below, (2) no response to a D.C. signal, and (3) must recover in a few milliseconds from a step change such as that encountered in moving into gaging position. These requirements are, of course, inconsistent and, although the differential transformer can be used in a conventional method to gage out-of-roundness, it can be done only at a low gaging speed, high gaging speed being obtainable only when the aforedescribed circuitry according to this invention is employed. In other words, this invention provides for high-speed gaging of out-of-roundness even though a conventional differential transformer is employed. This is by virtue of the fact that both peak and modulation detectors are used with their outputs being compared and effectively subtracted.

Since condenser 58 retains its charge for a rather lengthy time, generally longer than an inspection cycle, it is convenient to include in the apparatus a means for discharging the peak signal stored in this condenser. Such means may take the form of a resistor 68 in series with a switch 70 disposed across condenser 58. This switch may be manually or automatically operated as desired, and of any desired type such as mechanical, semiconductor, gas tube, vacuum tube, etc. In any event, switch 70 is closed for a sufficient time between inspection periods to discharge condenser 58 through resistor 68.

Actual instantaneous diameter, as previously indicated, is sensed by the demodulator 54, and minimum diameter is sensed by the peak detector 52. Accordingly, it is immediately possible to provide an indication of either minimum or maximum diameter, or both, simultaneously with out-of-round gaging. For example, minimum diameter may be determined by taking a separate signal from the peak detector 52, and maximum diameter may be determined by sensing the minimum or valley points in the signal produced across condenser 64. Maximum diameter gaging can be effected by detecting coincidence, for example, between a predetermined voltage setting and the valley points of the modulation envelope as it appears for example at junction 72.

The signal which exists from junction 72 to ground is a negative D.C. voltage varying in amplitude as the diameter of bottle 10 varies. This provides the ability to gage bottle diameter by the diameter gaging circuitry generally designated 74. In operation of this circuit, arm 76 of potentiometer 78 is initially adjusted to be equal and opposite in polarity to the voltage at point 72 corresponding to the mean or ideal diameter of the bottle to be gaged. If resistors 80 and 82 are equal in value, then at the mean diameter, the voltage on arm 84 of potentiometer 86 is zero for any position of arm 84. Therefore, the voltage output to junction 88 is zero at the mean diameter.

However, if the diameter of bottle 10 is other than mean, the voltage at junction 72 is more or less than the voltage on arm 76, and the difference therebetween exists across the potentiometer 86. The voltage on arm 84 is therefore a function of the difference voltage and the position of the arm on potentiometer 86. Accordingly, this potentiometer operates as a sensitivity or limit control. The voltage on arm 84 is applied to junction 88 and across resistor 90 through a back-to-back or clipping Zener diode 92. As commonly known in electronics, this type of diode provides both a positive and negative voltage threshold below which no current will flow. Voltages in excess of this threshold cause the diode to present for all practical purposes a short circuit. The signal to junction 88, then, is only that which is in excess of the threshold or Zener voltage, whether that voltage is positive or negative. The polarity of the signal to junction 88 indicates whether the diameter of bottle 10 is above or below the predetermined limits set, and how much. The actual correlation between diameter and polarity is determined by the direction of travel of the differential transformer. In the above described situation, minimum diameter produces maximum signal from the differential transformer and at junction 72. Since the signal at that junction is negative, the output at junction 88 is also negative. Thus a negative signal at junction 88 represents an under-minimum diameter condition, and conversely, a positive voltage at junction 88 represents an over-maximum diameter condition.

The signal at junction 88 may be applied to any desired sort of mechanism for indicating intolerable diameters or rejecting bottles which have intolerable diameters.

It will be appreciated of course that idler arm 12 need not be positioned relative to object 10 in such a manner that arm 12 oscillates vertically, since horizontal oscillation or oscillation at any inbetween angle is encompassed by this invention. Furthermore, idler arm 12 may be removed entirely and the nose 36 of transformer arm 28 suitably modified to ride directly against the periphery of object 10. In addition, instead of using spring 34 to bias arm 28 upwardly or otherwise toward object 10, arm 28 may be changed to be, at least along part of its length, the core of a solenoid that is continuously energized during inspection of the object to maintain a releasable magnetic bias on arm 28.

As another modification, Zener diode 92 may be replaced by any other desired circuitry for establishing positive and negative thresholds. For example, the signal on line 84, after amplification if desired, may be applied in parallel to one side of two neon bulbs the other sides of which are connected to fixed voltages respectively representing maximum and minimum diameter limits. If the signal on line 84 then changes sufficiently in either direction from an established mean, the appropriate one of the neon bulbs will fire and give out a signal sufficient to trigger a bistable multivibrator to the corresponding state. Alternatively, the over-mean and under-mean diameter signals on line 84 may be channeled by oppositely poled diodes across respective maximum and minimum limit setting potentiometers the taps of which are coupled to the grids of respective triodes. The outputs of the triodes may then be coupled to neon bulbs, which are otherwise connected to the same fixed potential, to effect reject pulses to a multivibrator as above indicated.

Thus, there has been described apparatus which provides all of the foregoing objects and advantages. Modifications will be apparent to those of ordinary skill in the art after reading this disclosure, and it is to be understood that there is no intention to limit this invention to the exemplary apparatus described since the scope of this invention is determined by the following claims.

What is claimed is:

1. Apparatus for inspecting the peripheral configuration of circular objects for out-of-round condition comprising means for translating the peripheral configuration of a said object into an electrical signal which has a characteristic that varies according to said out-of-round condition and attains a maximum excursion while said inspecting is taking place, and means for obtaining a continuous fluctuating indication representing the difference between the maximum excursion derived during said inspection process and the instant values of the said signal characteristic regardless of the diameter of the said object being inspected.

2. Apparatus as in claim 1 wherein said translating means includes a differential transformer.

3. Apparatus as in claim 1 wherein said translating means causes said signal to be a modulated carrier the modulation of which has said characteristic, said indication obtaining means including means for detecting said modulation and effectively comparing by algebraic addition the peak and instant values of the said characteristic of said detected modulation to provide an instantaneous value of a said condition.

4. Apparatus for inspecting the peripheral configuration of circular objects for out-of-round condition comprising means for amplitude modulating a carrier signal, the amplitude of the carrier signal being a characteristic of the signal that varies according to said out-of-round condition, means for demodulating said carrier signal to recover a first signal which is a direct function of the instantaneous diameter of said object, means for effecting a signal representing the peak of said first signal, and means for subtracting said recovered modulation and peak signal to give an instantaneous value of a said condition.

5. Apparatus as in claim 4 wherein said peak modulation effecting means includes a storage element for storing the said peak modulation signal.

6. Apparatus as in claim 5 and further including means for discharging the said storage element of its said signal between successive inspections of said objects.

7. In apparatus for inspecting the peripheral configuration of rotating circular objects for out-of-round condition, the improvement comprising means for obtaining a first signal having a constant value which is a direct function of an extreme diameter of said rotating object while said inspecting is taking place, means for obtaining a second signal which is a direct function of the instantaneous diameter of said rotating object, and means for combining said first and second signals to obtain a third signal which fluctuates as a direct function of any variation in diameter of said rotating object regardless of the absolute diameter thereof to provide an instantaneous indication of a said condition.

8. Apparatus as in claim 7 wherein the said improvement includes a differential transformer an input of which varies as the peripheral configuration of said rotating object and the output of which is coupled to each of the two aforesaid obtaining means.

9. Apparatus as in claim 7 wherein said given diameter is the minimum diameter of the said object.

10. An apparatus for inspecting the peripheral configuration of rotating circular objects for out-of-round conditions, the improvement comprising means for obtaining a first signal having a constant value which is a direct function of an extreme diameter of said rotating object while said inspecting is taking place, means for obtaining a second signal which is a direct function of the instantaneous diameter of said rotating object, means for combining said first and second signals to obtain a third signal which fluctuates as a direct function of any variation in diameter of said rotating object regardless of the absolute diameter thereof to provide an instantaneous indication of a said condition, and means responsive to one of said first and second signals for providing a given output only when that second signal is greater in magnitude than a predetermined magnitude.

11. Apparatus as in claim 10 wherein the said output providing means is responsive to said second signal and provides an output indicating if the said object has an intolerable diameter.

12. Apparatus as in claim 11 wherein said output providing means includes means for determining tolerable maximum and minimum diameters and provides an output signal for any over maximum or under minimum diameter of the object being inspected.

13. Apparatus as in claim 12 wherein the maximum and minimum diameter determining means includes an arrangement for providing positive and negative voltage thresholds representing said maximum and minimum diameters.

14. Apparatus as in claim 13 wherein said arrangement includes diode means.

15. Apparatus as in claim 14 wherein said diode means includes a Zener diode.

16. Apparatus as in claim 8 including movable object contacting means coupled to said transformer for providing said input thereto, said object contacting means and transformer being correlated relative to the object being inspected to cause the said transformer output to be always on one side of null during inspection regardless of the amount of variation in diameter of the object being inspected.

17. Apparatus as in claim 8 including movable object contacting means coupled to said transformer for providing said input thereto, said given diameter being the minimum diameter of the object being inspected, the amplitude of said first signal being the said direct function of said minimum diameter, the instantaneous amplitude of said second signal being the said direct function of said instantaneous diameter, said third signal being obtained in said combining means by continuously subtracting the amplitudes of said first and second signals to provide a third signal having an amplitude of zero until after said contact means comes into initial contact with an out-of-round object being inspected and thereafter an amplitude representing variations in diameter of that object.

References Cited

UNITED STATES PATENTS

| | | | |
|---|---|---|---|
| 2,854,651 | 9/1958 | Kircher | 307—88.5 |
| 2,987,825 | 6/1961 | Torn et al. | 33—172 |
| 3,064,809 | 6/1962 | Anthony et al. | 33—179.5 |
| 3,136,069 | 6/1964 | Reason | 33—174 |

FOREIGN PATENTS 860,444   2/1961   Great Britain.

OTHER REFERENCES

German printed application #P 9,654, Perthen et al., Mar. 15, 1956, 1 sht. dwg., 6 pp. spec., 73–105.

SAMUEL S. MATTHEWS, *Primary Examiner.*

ISSAC LISANN, LEONARD FORMAN, *Examiners.*